United States Patent [19]
Reime

[11] Patent Number: 5,392,127
[45] Date of Patent: Feb. 21, 1995

[54] COMB FILTER CIRCUIT ON THE REPRODUCTION SIDE OF THE COLOR CHANNEL OF A VIDEO RECORDER

[75] Inventor: Gerd Reime, Schömberg, Germany

[73] Assignee: Nokia Technology GmbH, Pforzheim, Germany

[21] Appl. No.: 141,385

[22] Filed: Oct. 22, 1993

[30] Foreign Application Priority Data

Oct. 24, 1992 [DE] Germany ............... 4236019

[51] Int. Cl.$^6$ .............. H04N 9/78; H04N 9/79
[52] U.S. Cl. .................. 358/329; 358/328; 358/327; 348/665
[58] Field of Search .......... 358/329, 328, 327, 310, 358/31, 36, 37, 40, 21 R; H04N 9/78, 9/79; 348/663, 665, 667

[56] References Cited

U.S. PATENT DOCUMENTS

| 3,836,707 | 9/1974 | Murakami et al. | 358/31 |
| 4,796,096 | 1/1989 | Sakura et al. | 358/329 |

FOREIGN PATENT DOCUMENTS

| 293188 | 11/1988 | European Pat. Off. . |
| 296831 | 12/1988 | European Pat. Off. . |
| 206521 | 10/1981 | Germany . |
| 3939520 | 11/1989 | Germany . |
| 4022923 | 7/1990 | Germany . |
| 4115213 | 5/1991 | Germany . |
| 2066615 | 7/1981 | United Kingdom . |

Primary Examiner—Tommy P. Chin
Assistant Examiner—Khoi Truong

[57] ABSTRACT

A comb filter circuit (1) with a usual comb filter (3) contains a circuit to detect line-parallel color edges. To that effect, envelope curves (Sf2, Sf3) are created from the addition signal (Sb) and the subtraction signal (Sc) of the delayed and the undelayed color signal (Si) on the input side of envelope curve demodulators (23, 15), and a control signal (St) is created in a comparator circuit (38) by comparing the envelope curves, which adjusts the signal portions of the transmitted and delayed color signal on the input side, and transmits them with an adjustable electronic fader control (40) to the signal output (29) of the comb filter circuit. To ensure trouble-free control even under operating conditions, during which a large portion of cross talk signals are scanned, an additional comb filter (31) is connected to the signal path of the subtraction signal (Sc), which eliminates most of the cross talk portions on this signal path.

4 Claims, 3 Drawing Sheets

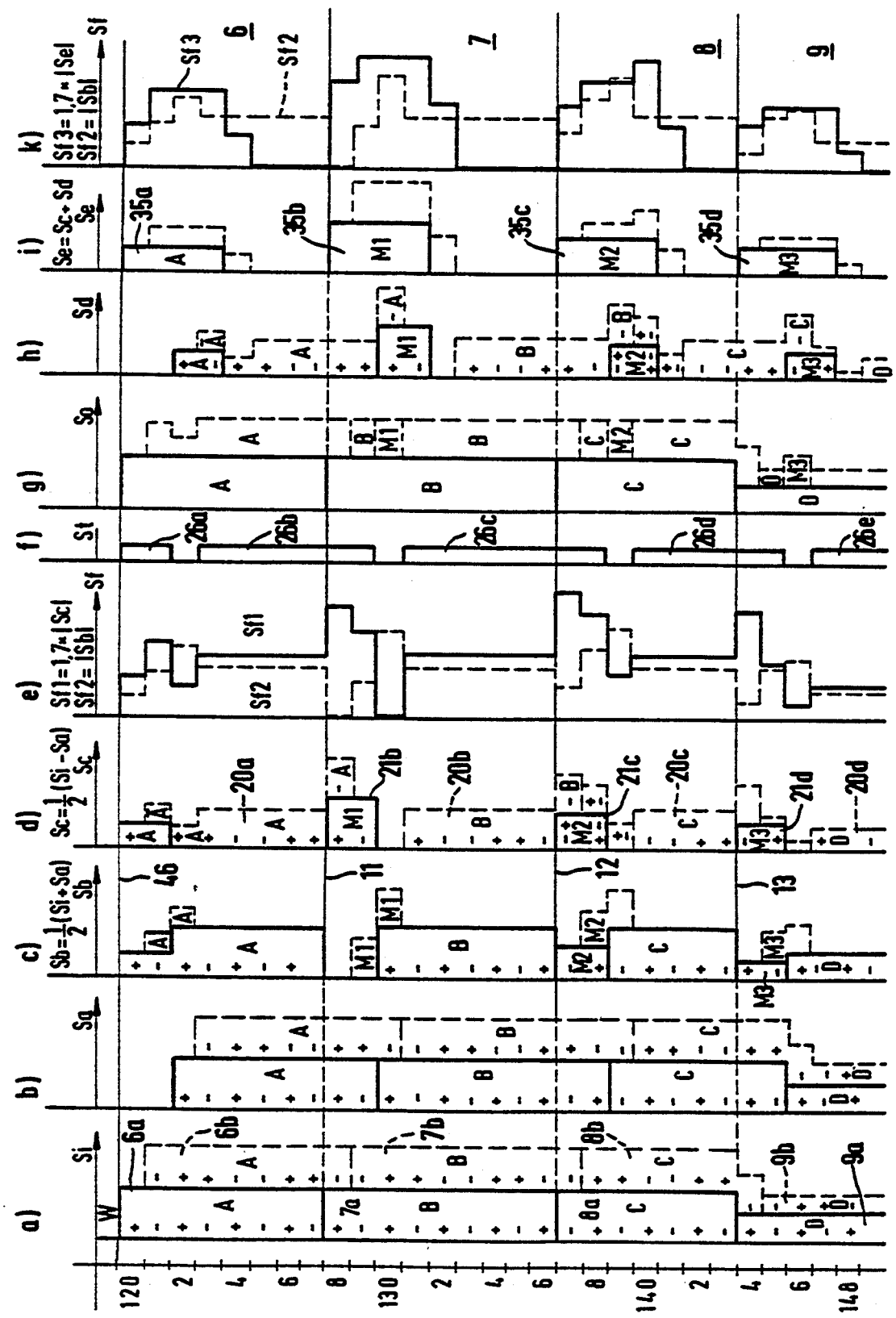

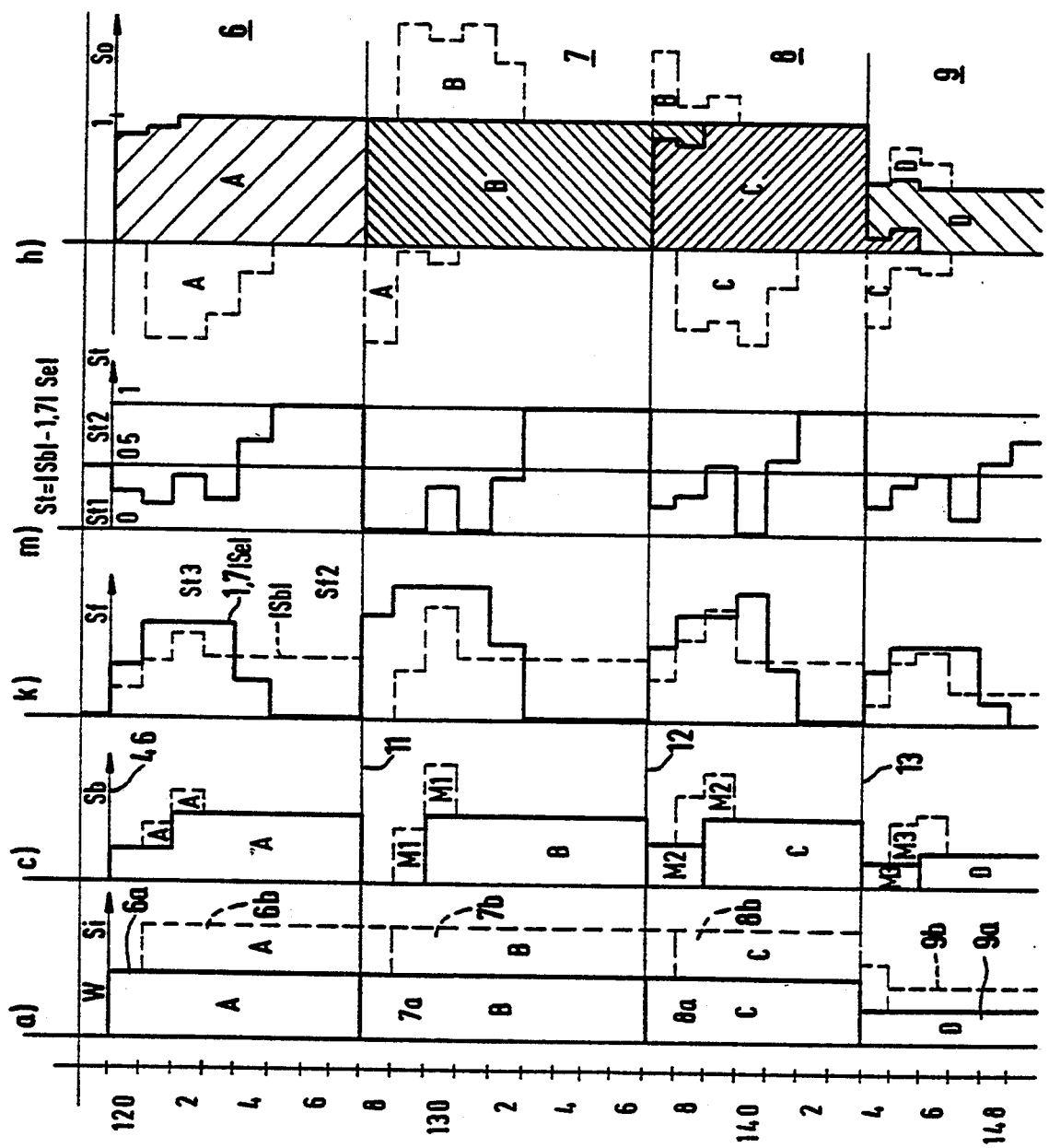

COMB FILTER CIRCUIT ON THE REPRODUCTION SIDE OF THE COLOR CHANNEL OF A VIDEO RECORDER

TECHNICAL FIELD

The attention concerns a comb filter circuit located on the on side of the color channel of a video recorder.

BACKGROUND OF THE INVENTION

The usual video color signal (FBAS-signal) in video recorders is divided into a luminance signal (Y-signal) and a color signal (Chroma-signal). Before it is recorded on a video tape, the luminance signal is limited to a predetermined frequency band, converted to a frequency modulation, and modulated to a predetermined carrier range during this conversion. For recording on a video tape, the color signal is transposed to a frequency range that is below the range of the frequency modulated luminance signal. Each of the video fields to be transmitted is recorded on a helical scan of the video tape. The helical scans are close to each other on the video tape, without any gaps. In a helical scan, the video field lines of adjacent helical scans are arranged in such a way, that the lines of adjacent helical scans are completely parallel to each other. To prevent cross talk between adjacent helical scans during playback, the two magnetic heads, which are provided on a head drum both for recording the video fields in the helical scan, and for playback of the recording, contain a different angle of their head gap with respect to the helical scan, which makes an individual video head only effective for the helical scan assigned to it, and leaves it relatively ineffective for scanning adjacent helical scans. However, this angled position of the head gap in video heads loses its effect in the frequency range in which color is recorded on the video tape.

It is customary to install a comb filter in the color channel on the reproduction side, to compensate for the cross talk that occurs during the scanning of the color signal on the video tape, which, in the simplest case, consists of a delay circuit for delaying one or more video lines, and a signal addition circuit. This comb filter, in conjunction with the repeated sequence of successive lines of the recorded video fields in a different phase relation, erases most of the cross talk signals from the added wanted signals. However, such a comb filter does not prevent an interference streak of a faulty color to appear between the two color surfaces of a line-parallel transition edge of two different colors, caused by the delay of one or more lines in the comb filter. Furthermore, this interference streak expands and is line-parallel displaced with each copy of a recording, so that the color of the playback copy is significantly more faded and blurred than the original recording.

To switch off the color distortion caused by the comb filter in the line-parallel color edges, it is known from DDR Patent 206 521 to detect such a line-parallel color edge with a phase comparator placed parallel to the delay circuit of the comb filter, and, in the event a color transfer has been detected, to separate the second addition input of the addition circuit from the output of the delay circuit. This switches off the distortion effect of the comb filter. The process of the cited publication assumes that the error signal occurring during phase comparison is an immediate measure of the similarity of the color signals. According to the cited publication, this statement only applies when the ratio between the delay time of the delay circuit and the period of the delayed oscillations is a whole number. The effect of the known arrangement is therefore restricted to a very narrow operating range, in which the whole number condition for the phase comparison is at least approximately maintained. This only applies to a small portion of the transmission conditions, so that the picture distortions take place with little change. To reduce the number of picture distortions, the cited patent further proposes to place a subtraction circuit in parallel with the addition circuit of the comb filter, and to essentially supply the larger output signal of the addition or the subtraction circuit to an additional output stage. The known circuit therefore automatically selects a sum or a difference signal as the output signal. With equal phase added, or antiphase subtracted color signals, the thus configured known comb filter transmits the color signal with full comb filter effect through the addition circuit on the output side. This eliminates cross talk disruptions between the adjacent video lines of a video field, even with larger phase deviations, but not, however, the color distortions in horizontal edges of a line-parallel color tone or color intensity transition, caused by the effect of the comb filter. The use of such a comb filter rather increases such line-parallel faulty colors in color transitions, so that the viewer of such a video color picture has to view a considerably more distorted color picture.

For this reason, a various type of comb filter is known from the U.S. Pat. No. 4,931,851. The publication describes a voltage controlled comb filter which comprises a 1 H delay circuit, an inverting circuit, and a mixing circuit. The playback carrier chrominance signal is delayed by the delay circuit for 1 H period and is inverted by the inverting circuit. The playback and delayed playback carrier chrominance signals are inputted to the mixing circuit which mixes these signals in proportion in accordance with the degree of a line correlation error signal. Therefore, there is no switching noise inherent in the conventional comb filter having a switch circuit used in a video type recorder.

The unpublished patent application DE 41 15 213 proposes to connect a detection circuit to the signal outputs of the addition and subtraction circuits of a comb filter, which compares the envelope curves of the addition and the subtraction signals, and creates a control signal from the comparison when the envelope curve of the subtraction signal is larger than the envelope curve of the addition signal, and sets the comb filter circuit, so that the amplitude of the envelope curve of the subtraction signal, which is significant for the comparison in the comparison circuit, during a line-parallel color transition from a white background to a color tone of a predetermined color saturation, is larger than the amplitude of the envelope curve of the addition signal. The proposal assumes that the level of the wanted signals scanned from a video tape is higher than the level of the simultaneously scanned cross talk signals, and that, with the indicated setting of a proposed comb filter circuit, even at a low level of the color signal, the level of the difference signal from the delayed and the undelayed color signal in a color tone or color intensity transition, which can be recognized by the viewer, is nearly always higher than the level of the addition signals simultaneously formed from these color signals. With small color tone and/or color intensity changes in line-parallel transitions, which the viewer can no longer detect, any additional changes in color tone and in color, caused by the comb filter effect, no longer affect the viewer, so that these additional changes in color tone and/or color intensity do not represent any disruptions of the total impression of the reproduced color video picture.

SUMMARY OF THE INVENTION

The proposed comb filter configures the transmitted color signal for the playback of a color video picture, so that it corresponds primarily to the wanted signal recorded on the video tape and scanned for playback. In most instances of playing back a recorded video presentation with this configuration, the viewer does not detect cross talk distortions occurring in the line-parallel color edges, since they are covered by the color transition insofar as the viewer can detect.

However, it was shown that under some playback conditions, in particular during a search or during operating conditions with a slow or stopped tape, cross talk signals with a level can occur, which are in the vicinity of the level of the wanted signal, and unwanted switch the effect of the comb filter off, during that time.

The invention has the task of configuring a comb filter circuit in such a way that the comb filter remains effective, even during the cited playback operating conditions. The invention fulfills this task to advantage by the use of a second comb filter, which is located between the output of the signal subtracter and the input of the signal comparator circuit, and contains a line delay arrangement to delay the line of the line delay arrangement on the input side.

In the continued development of the proposed comb filter circuit according to the invention, the comb filter effect is only switched off in the area of a line-parallel color transition when the cross talk signals exceed the wanted signals, while it remains during the playback of a color surface.

It was shown to be of particular advantage to replace the signal switch for switching off the effect of the comb filter on the input side, which causes a color distortion in a line-parallel color transition of the video picture being played back, by an electronic fader control, which can be adjusted by a control signal, where the fader path is located between the input and the output of the line delay arrangement on the input side, and to configure the comparator circuit in such a way, that it creates a control signal instead of a switching signal, whose direction and control level correspond to the direction and the degree of deviation of the envelope curve level from each other, and whose direction is controlled in such a way, that the fader control is adjusted for the increasing transmission of the undelayed color signal on the input side, when the level of the envelope curve of the subtraction signal is larger than the level of the envelope curve of the addition signal. On the one hand, this adjusts the effect of the comb filter circuit so that it is practically switched off over a wide intensity range of line-parallel color transitions, on the other hand, however, it is restricted for line-parallel color transitions of low intensity, so that the disturbing cross talk, which is stronger in this case, is diminished.

A further advantageous configuration of the invention is a comb filter circuit where the level of the envelope curve (Sf1) of the subtraction signal (Sc), which is significant for the comparison, is adjusted to about 1.5 to 1.8 times the size of the level of the envelope curve (Sf2) of the addition signal (Sb), in a line-parallel color transition (46) from a white background (W) to a saturated color tone (A).

Another advantageous configuration of the invention is a comb filter circuit characterized by an electronic fader control that is adjustable by a control signal (St), instead of the signal switch on the output side, whose fading path is located between the signal input and the signal output of the comb filter on the input side, and by a comparator circuit, which produces a control signal (St) instead of a switching signal, whose direction and control level correspond to the direction and the degree of deviation of levels of envelope curves (Sf2, Sf3), and whose direction is adjusted so that the fader control is set for an increasing transmission of the color signal (Si) on the input side, when the level of the envelope curve (Sf3) of the subtraction signal (Se) at the signal output of the additional comb filter, which is evaluated by the comb filter, is larger than the level of the envelope curve (Sf2) of the addition signal (Sb).

BRIEF DESCRIPTION OF THE DRAWINGS

In the following, the invention will be explained in greater detail by means of an advantageous configuration example. In the drawings:

FIG. 2a and 2b are diagrams a) to m) representing the function of the comb filter circuits shown in FIGS. 1 and 3.

BEST MODE FOR CARRYING OUT THE INVENTION

Figure 1:
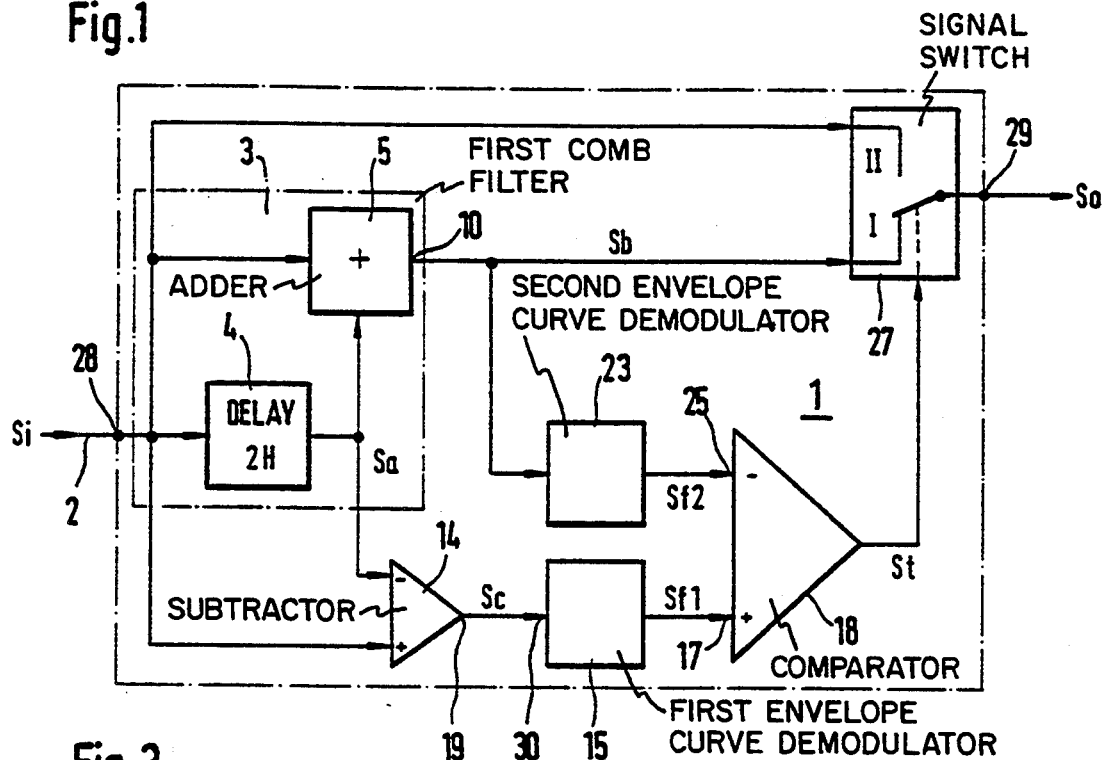
FIG. 1 is a block circuit diagram of a comb filter circuit without any additional comb filter.

FIG. 1 shows the block circuit diagram of a comb filter circuit 1 in a not shown color channel 2 on the playback side of a video recorder. The illustrated comb filter circuit contains a comb filter 3 on the input side, with a line delay arrangement 4 and a signal adder 5, which forms the arithmetic mean of the color signal Si on the input side and the delayed color signal Sa on the input side. In the illustrated configuration example, the line delay arrangement is a two-line delay circuit, which delays a color signal on the input side by the period of precisely two video lines.

The effect of such a comb filter 3 is illustrated in more detail in diagrams a) to c) of FIG. 2a. The effect of this comb filter lies in a predetermined phase relationship of the lines of a field that is recorded in a helical scan on a video tape, and the parallel lines of the two adjacent helical scans. Diagram a) schematically shows the scanning of lines 120 to 149 of a video picture. The reproduction of 4 color areas is shown after a white background W, namely the color area 6 with color A, color area 7 with color B, color area 8 with color C and color area 9 with color D. In the illustrated configuration example, the phase of the scanned lines changes 180° from line to line, which is indicated by changing signs + and −. Blocks 6a, 7a, 8a and 9a represent the level of the scanned wanted signal Si, namely the color signals for colors A, B, C and D on the input side. Blocks 6b, 7b, 8b and 9b represent the level of the cross talk signals which are scanned simultaneously with the wanted signal in the adjacent track. In the illustrated configuration example, the levels of the cross talk signals are about 75% of the wanted signal levels. Due to the standard line displacement of adjacent helical scans, the cross talk lines are displaced by one line with respect to the wanted signals in the illustrated configuration example. In the adjacent track containing the cross talk lines, the phase of the lines is rotated by 180° after two lines.

Diagram c) represents the level of the addition signal Sb at the signal output 10 of the signal adder 5 on the input side of the comb filter 3. Due to the comb filter effect, the cross talk signals of colors A, B, C and D are obliterated, while several lines with mixed colors M1, M2 or M3 occur in the line-parallel color transitions 11, 12 and 13.

To avoid these mixed colors, the comb filter circuit 1 contains a signal subtracter 14, which subtracts the output signal Sa of the delay line 4 from the input signal Si of this delay line, and supplies it to the noninverting input 17 of a comparator circuit 18 through an envelope curve demodulator 15. The subtraction signal Sc at the signal output 19 of signal subtracter 14 is illustrated in diagram d). It essentially contains the arithmetic mean of the cross talk signals of the undelayed (Si) and the delayed (Sa) input signal, schematically shown by the dashed level blocks 20a, 20b, 20c and 20d in diagram d). The mixed color blocks 21b, 21c and 21d formed in color transitions 11 to 13 must be added, which are shown in diagram d) as level blocks of the wanted signal. The envelope curve signal Sf1, which is produced by envelope curve demodulator 15 from the subtraction signal Sc of signal subtracter 14 represented in diagram d), and which is amplified by a factor in a range of 1.5 to 1.8, and in particular, by a factor of 1.7 in the illustrated configuration example, is shown in diagram d) by the uninterrupted level line 24. A second envelope curve demodulator 23 gains an envelope curve signal Sf2 from the addition signal Sb of the signal adder 5, which is shown in diagram e) by the dashed level line, and is supplied to the inverting signal input 25 of comparator circuit 18. In the illustrated configuration example, the comparator circuit produces a switching signal St, represented in diagram f) by beams 26a to 26e, when the level of the envelope curve of the amplified subtraction signal Sc exceeds the level of envelope curve Sf2 of the addition signal Sb. With the heavy participation of the cross talk, the envelope curve signal Sf1 of the amplified subtraction signal Sc in the illustrated configuration example exceeds almost completely the envelope curve signal Sf2 of addition signal Sb, so that the signal switch 27 on the output side, which is controlled by the switching signal St of comparator circuit 18, switches almost exclusively to the switch position II, in which the signal input 28 of the comb filter circuit is directly connected to the signal output 29 of the comb filter circuit, and the effect of the comb filter in circuit 1 is almost entirely switched off, as shown schematically in diagram g).

Figure 3:
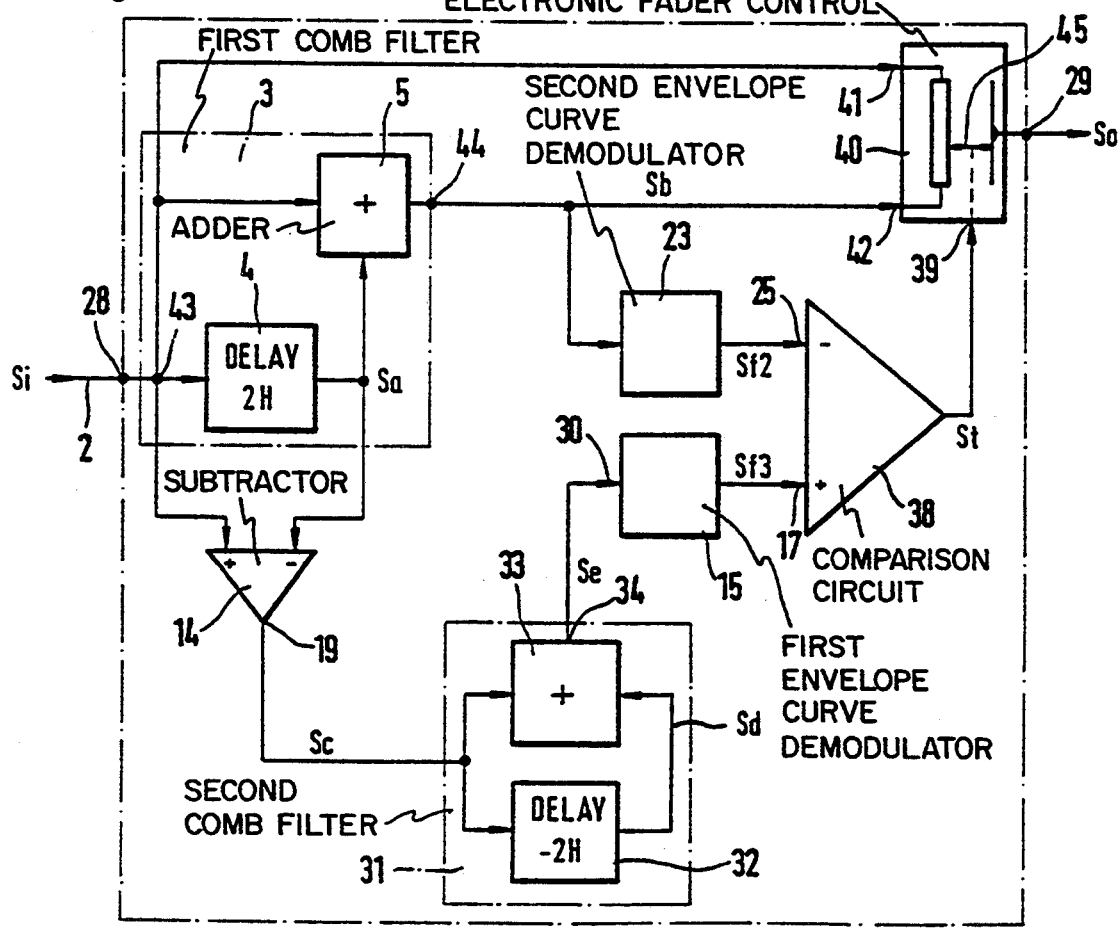
FIG. 3 is a block circuit diagram of a comb filter circuit with an additional comb filter.

To prevent this, an additional comb filter circuit 31, shown as a block circuit diagram in FIG. 3, which also corresponds to the comb filter circuit 1 shown in FIG. 1, is switched between signal output 19 of signal subtracter 14 and the signal input 30 of the envelope curve demodulator 15 for subtraction signal Sc, and consists of a line delay arrangement 4 of line delay 32 corresponding to the input side of comb filter 3, and a signal adder 33. Due to the signal addition of the undelayed subtraction signal Sc and the delayed subtraction signal Sd, which is delayed in delay line 32 of the additional comb filter 31 and is illustrated in diagram h), a comb filter-weighted subtraction signal Se results at the signal output 34, which is schematically shown in diagram i), and which is essentially free of cross talk signals, and only contains signal portions 35a to 35d in a few lines after a color transition 11, 12 or 13. From these signal portions, which are amplified in the illustrated configuration example about 1.7 times with respect to the signal portions of the addition signal Sb, so that the comb filter-weighted subtraction signal Se is dominant with respect to the addition signal Sb at the corresponding levels of the same value, an envelope curve signal Sf3 is formed in the pertinent envelope curve demodulator 15, whose level curve is illustrated by an unbroken line in diagram k). In addition, this diagram contains the dashed line of level curve of the envelope curve signal Sf2 of the addition signal Sb illustrated in diagram c). This diagram k), together with diagrams a) and c), is once again represented in FIG. 2b for the color signal Si on the input side, and for addition signal Sb. The two envelope curve signals Sf2 and Sf3 are supplied to the two signal inputs 25 and 17 of a comparator circuit 38, which differs from the comparator circuit 18 of the comb filter circuit 1 in FIG. 1, in that it produces an analogous control signal St instead of a switching signal, as schematically shown in diagram m). The control level of this control signal St, and the direction of this control level, correspond to the direction and the degree of deviation of the level of both envelope curves Sf2 and Sf3 with respect to each other, and can move between two limit values St1 and St2. In the illustrated configuration example, the control level of control signal St can move between the values of 0 and 1, where the comparator circuit 38 produces a control level of 0.5 when the level of both envelope curve signals Sf2 and Sf3 is equal, and a value between 0.5 and 0, when the level of envelope curve Sf2 of addition signal Sb is smaller, and a level between 0.5 and 1 when the level of envelope curve Sf2 of addition signal Sb is larger than level of envelope curve Sf3 of the comb filter-weighted subtraction signal Se. This control signal St is supplied to the control input 39 of an electronic fader control 40, which is located on the output side of the comb filter circuit shown in FIG. 3, instead of the signal switch 27 of FIG. 1, and where the signal input 43 and signal output 44 of the comb filter 3 on the input side are connected to signal inputs 41 and 42. If the levels of the two envelope curves Sf2 and Sf3 are the same, or if both levels are zero, the electronic fader control 40 is adjusted, so that it transmits the color signal Si on the input side, and the addition signal Sb formed in the comb filter 3 on the input side, as equal parts of an output signal So of the comb filter circuit, to its signal output 29. As the level of the envelope curve Sf3 from the comb filter-weighted subtraction signal Se increases with respect to the level of envelope curve Sf2 of addition signal Sb, the electronic control element 45 of electronic fader control 40 is adjusted by the control signal St of comparator circuit 38, so that the portion of the unfiltered color signal Si on the input side also increases at the output signal So of the comb filter circuit. The control speed of the electronic fader control 40 is such, that it immediately follows the flanks of the control signal St according to a signal switch 27, with the advantage, however, that the switching process is not interrupted but continues, so that no switching disruptions are created. The transmission and reproduction of a color surface with a color signal, which contains signal portions from both the input and the output of a comb filter, causes the photoelectric noise levels of the two types of signals to balance each other, without the remaining cross talk portions becoming noticeable. This applies particularly to low level color signals, which contain a lot of noise. Diagram n) schematically shows the output signal So in diagram m), which is controlled by control signal St of the comb filter circuit shown in FIG. 3. The signal portions of output signal So, which are weighted by the comb filter 3 at the input side, are hatched in diagram n). From this it can be seen that the comb filter 3 is always active in the indicated circuit when color surfaces are transmitted, even with very large cross talk portions from adjacent tracks. Furthermore, no distortions that can be detected by the viewer take place in the color transitions 11, 12 and 13, nor in the white transition 46.

The illustrated configuration examples refer to a transmission process on the playback side of video recorders, with a comb filter that delays two lines, and a corresponding phase treatment of the lines of individual helical scans of the video tape, from which the video transmission is reproduced. In a configuration example for the playback of video transmissions with single line delaying comb filters, the illustrated configuration examples replace the line delay arrangement 4 with a line delay arrangement that delays only one line. The same applies to transmission processes on the playback side, with other delay times created by the comb filter.

I claim:

1. A comb filter circuit (1) for a chrominance signal playback system of a video recorder, comprising:
    a first comb filter (3) having a line delay arrangement (4) that delays at least one video line of a carrier chrominance signal (Si) to form a delayed chrominance signal (Sa), having a signal adder (5) for adding the carrier chrominance signal (Si) and the delayed chrominance signal (Sa) to form an added chrominance signal (Sb), and having a signal subtracter (14) for subtracting the delayed chrominance signal (Sa) from the carrier chrominance signal (Si) to form a subtraction signal (Sc),
    a comparison circuit (38) that compares an amplitude of a signal (Sf2) provided by demodulation of the added chrominance signal (Sb) with an amplitude of a signal (Sf3) provided by demodulation of a cross talk free subtraction signal (Se), and produces a control signal (St),
    a voltage controlled mixing means (40) that turns off the effect of the first comb filter (3), which causes a faulty color in a parallel color transition line (11, 12, 13) of a reproduced video picture, when the control signal (St) indicates that the amplitude of the signal (Sf3) is larger than the amplitude of the signal (Sf2), and
    a second comb filter (31) located between an output (19) of the signal subtracter (14) and the comparison circuit (38), having a line delay arrangement (32), responsive to the Subtraction signal (Sc) for providing said cross talk free subtraction signal (Se).

2. A comb filter as in claim 1, characterized in that voltage controlled mixing means (40) is an electronic fader control that is adjustable by said control signal (St), whose fading path (41–42) is located between a signal input (43) and a signal output (44) of the first comb filter (3), and
said comparison circuit (38), which produces said control signal (St), whose direction and control level correspond to a direction and a degree of deviation of amplitudes of (Sf2, Sf3), and whose direction is adjusted so that said electronic fader control is set for an increasing transmission of said carrier chrominance signal (Si), when the amplitude of said signal (Sf3) of said cross talk free subtraction signal (Se) at a signal output (34) of the second comb filter (31) is larger than the amplitude of said signal (Sf2) of the addition signal (Sb).

3. A comb filter as in claim 1, characterized in that a first transmission factor relating to the signal (Sf3) provided by demodulation of the cross talk free subtraction signal (Se) is adjusted to about 1.5 to 1.8 times a second transmission factor relating to the signal (Sf2) provided by demodulation of the added chrominance signal (Sb).

4. A comb filter circuit (1) for a chrominance signal playback system of a video recorder, comprising:
    a first comb filter (3) having a line delay arrangement (4) for delaying at least one video line of a carrier chrominance input signal (Si) to form a delayed chrominance signal (Sa), having a signal adder (5) for adding the carrier chrominance input signal (Si) and the delayed chrominance signal (Sa) to form an addition signal (Sb), and having a signal subtracter (14) for subtracting the delayed chrominance signal (Sa) from the carrier chrominance input signal (Si) to form a subtraction signal (Sc);
    a second comb filter (31) having a line delay arrangement (32) for delaying the subtraction signal (Sc) to form a delayed subtraction signal Sd and having an adder circuit 33 for adding (Sd) to form a comb filter-weighted subtraction signal (Se); the subtraction signal (Sc) and the delayed subtraction signal
    a first demodulation means (23) for demodulating the addition signal (Sb) to form a demodulated addition signal (Sf2);
    a second demodulation means (15) for demodulating the comb filter-weighted subtraction signal (Se) to form a demodulated filter-weighted subtraction signal (Sf3);
    a comparison circuit (38), responsive to the demodulated addition signal (Sf2) and the demodulated filter-weighted subtraction signal (Sf3), for providing a control signal (St) depending a relationship between an amplitude of the demodulated filter-weighted subtraction signal (Sf3) and the amplitude of the demodulated addition signal (Sf2); and
    an electronic fader control means (40), responsive to the control signal (St), further responsive to the carrier chrominance signal (Si), and further still responsive to the addition signal (Sb), for providing an adjusted chrominance output signal (So).

* * * * *

UNITED STATES PATENT AND TRADEMARK OFFICE
CERTIFICATE OF CORRECTION

PATENT NO. : 5,392,127
DATED : February 21, 1995
INVENTOR(S) : G. Reime

It is certified that error appears in the above-indentified patent and that said Letters Patent is hereby corrected as shown below:

At column 7, claim 1, line     please change "Subtraction" to --subtraction--.

At column 8, claim 2, line     after "amplitudes of", please insert --signals--; and claim 4, please delete lines     and substitute --adder circuit 33 for adding the subtraction signal (Sc) and the delayed subtraction signal (Sd) to form a comb filter-weighted subtraction signal (Se);--.

Signed and Sealed this

Twenty-fifth Day of April, 1995

Attest:

BRUCE LEHMAN

*Attesting Officer*    *Commissioner of Patents and Trademarks*